Nov. 29, 1955 A. L. HOPPER 2,725,555

AUTOMATIC FREQUENCY CONTROL

Filed July 16, 1948 2 Sheets-Sheet 1

INVENTOR
A. L. HOPPER
BY G H Stevenson
ATTORNEY

Nov. 29, 1955 A. L. HOPPER 2,725,555
AUTOMATIC FREQUENCY CONTROL
Filed July 16, 1948 2 Sheets-Sheet 2

INVENTOR
A. L. HOPPER
BY G H Stevenson
ATTORNEY

United States Patent Office 2,725,555 Patented Nov. 29, 1955

2,725,555

AUTOMATIC FREQUENCY CONTROL

Andrew L. Hopper, River Edge, N. J., assignor to Bell Telephone Laboratories, Incorporated, New York, N. Y., a corporation of New York Application July 16, 1948, Serial No. 39,110

15 Claims. (Cl. 343—17.1)

Figure 1:
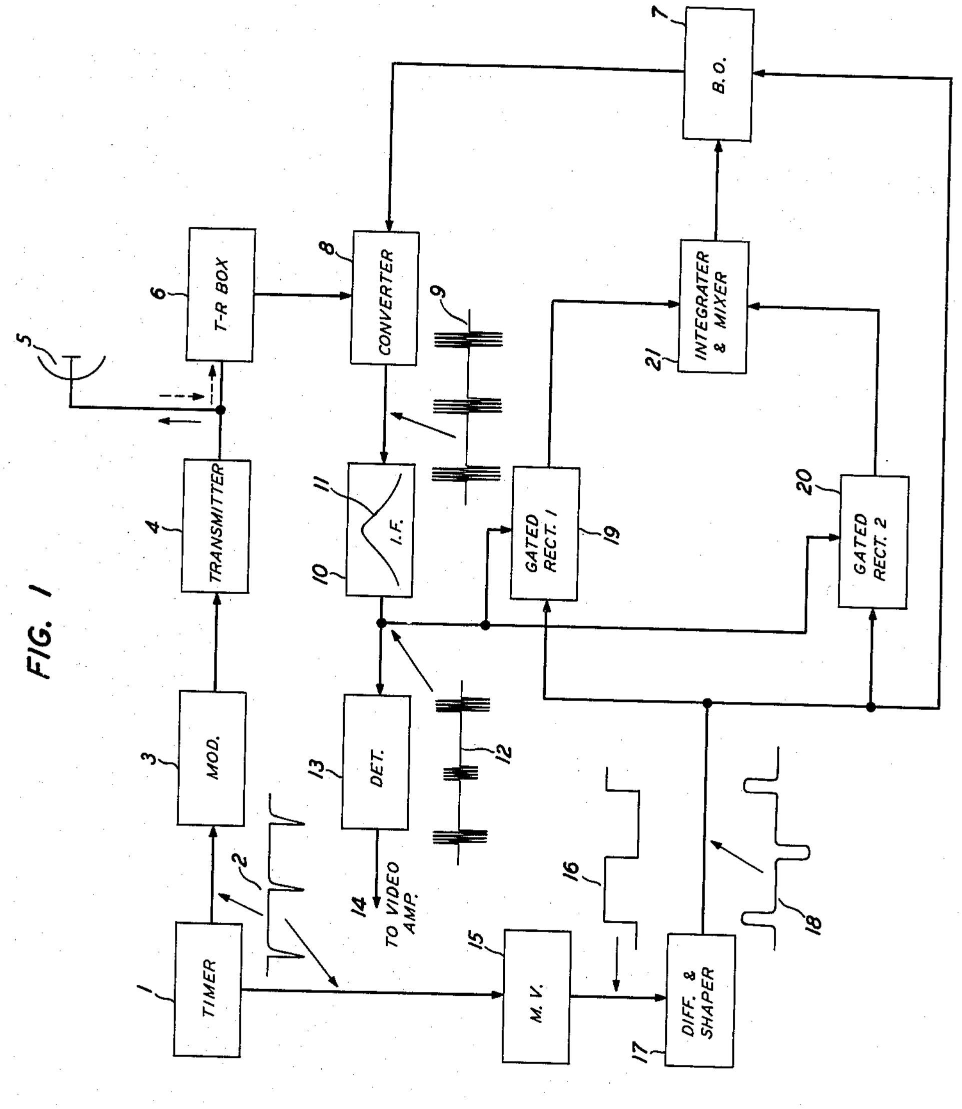

This invention relates to automatic frequency control circuits for pulse type transmitter-receiver systems in which a conversion from a very high to an intermediate frequency is employed for amplification of the received pulses.

An object of the invention is to control automatically the frequency of the beating oscillator included in such a system so that the intermediate frequency remains centered within the pass-band of the receiver.

Another object is to control the frequency of the beating oscillator in a superheterodyne receiver with reference to the selective frequency characteristic of the intermediate frequency amplifier instead of with reference to an auxiliary standard.

A further object of the invention is to maintain a fixed frequency difference between two sources of high frequency waves.

In a pulse type transmitter-receiver system such, for example, as a radar, which includes a transmitter of regularly recurring pulses of high frequency waves of very short duration and a receiver for the reception of reflected waves from distant objects, it is necessary that the receiver be highly sensitive and sharply tuned in order to detect the extremely weak signals arriving at its terminals. The transmitter frequencies used in radars may be as high as 30,000 megacycles, and since amplification at such frequencies is ordinarily not practicable, it is customary to effect a conversion of the received signals to a frequency that is suitable for amplification. For this purpose a beating oscillator and a converter comprising a non-linear rectifier are used. The output of the converter, to which is fed the incoming reflected waves together with the waves from the beating oscillator, includes, among others, the sum and difference frequencies of the two inputs, from which the difference frequency is selected by filtering. The frequency of the beating oscillator may be either higher or lower than that of the transmitter. Waves of the converted frequency, usually between 30 and 100 megacycles, are amplified to the desired level by an intermediate frequency amplifier, which is followed by the usual detector and video amplifier.

Frequency changes in either the transmitter or the beating oscillator will tend to cause the converted signal to drift out of the narrow intermediate frequency pass band of the fixed-tuned receiver. The possible frequency disturbing factors include mechanical shocks and vibration, and variations in temperature, atmospheric pressure, and supply voltage. In addition, the frequency of the transmitter oscillator may be affected by the radio frequency load impedance presented to the tube, which may vary with the position of the antenna in its scanning cycle. Variations in frequency due to the above causes may be slow or fast.

In order to maintain the difference frequency at its correct value a control of either the transmitter or the beating oscillator frequency is necessary. For practical reasons, in radar systems such as described it is usually the beating oscillator that is controlled. Provision for manually adjusting the oscillator frequency is generally made, but it is not usually possible to keep it in adjustment by such means; the use of automatic control of the beating oscillator frequency has therefore proved to be a necessity, especially in military radars.

In most automatic frequency control systems of the prior art the detection and correction of the frequency deviation or error depend upon the use of auxiliary tuned circuits, as for example in the "discriminator" type of control, or the use of an auxiliary standard of frequency, such as provided by a separate oscillator. The present invention employs a new method for obtaining the control voltage, in which the selectivity characteristic of the receiver itself is the criterion of correct tuning. Briefly, the method comprises the following steps: The beating oscillator is modulated by alternate positive and negative voltage pulses in synchronism with the outgoing transmitter pulses, with the result that its frequency is alternately raised and lowered for the duration of each pulse. Reduced amplitude pulses derived directly from the transmitter are demodulated with the beating oscillator pulses to produce pulses of a lower frequency. These pass through the tuned circuits of the intermediate frequency amplifier, and at the output will differ in amplitude if their frequencies are not centered about the mid-frequency of the amplifier response characteristic. The alternate pulses from the intermediate frequency amplifier are selected by means of synchronous gated rectifiers, giving rise to direct-current pulses proportional to their respective amplitudes. These segregated direct-current pulses are then integrated and filtered and the resulting steady voltages differentially combined to produce a control voltage representative of the slow variations of the mean oscillator frequency. If the oscillator frequency is too high the control voltage will be of the proper sign to lower it, and if the frequency is too low the control voltage will raise it. When the frequency is at its correct value the alternate pulses from the intermediate frequency amplifier are equal in magnitude and no control voltage is generated.

One of the inherent advantages of this method of automatic frequency control is that the selectivity characteristic of the receiver itself, rather than the properties of some auxiliary circuit, is used in detecting and correcting the frequency deviation.

Another advantage is its considerably greater tolerance to "T-R box spike." The "spike" is a relatively large leakage of transmitter energy through the electronic transmit-receive switch commonly termed the T-R box, occurring at the beginning of the transmitter pulse and resulting from the finite time required for ionization and breakdown discharge in the T-R tube. This is injurious to the satisfactory operation of controls such as the discriminator type, and is generally avoided by providing a circuit for blanking one stage of the intermediate frequency amplifier during the first part of the transmitter pulse. In the trend toward narrower transmitter pulses it becomes increasingly difficult to blank out the spike without at the same time degrading the signal. In the present control method it has been found that the spike is less harmful and requires no extra equipment for blanking. The omission of blanking allows the further incidental advantage of permitting the desired narrowing of the transmitter pulse.

Another advantage is that the "pull-in" range is greater than with prior systems. By this is meant the maximum incremental amount the beating oscillator may be off tune under manual control and still have the automatic control become effective when the latter is switched on.

A further advantage possessed by this method is that it will work equally well whether the normal frequency of the beating oscillator is above or below that of the transmitter, in contrast with the limitation of the commonly used discriminator circuit. This is of particular advantage when exclusive automatic tuning is employed (i. e., without any manual control), in which case the beating oscillator is swept over its operating range until it "locks in" on the correct frequency. In systems with both manual and automatic control there is an advantage afforded by the present method in being able to select the beating oscillator frequency that gives the greater power output, should there be any difference.

Still another advantage is that the circuit is inherently protected against jamming interference by other transmitters because of the gating employed.

Figure 2:
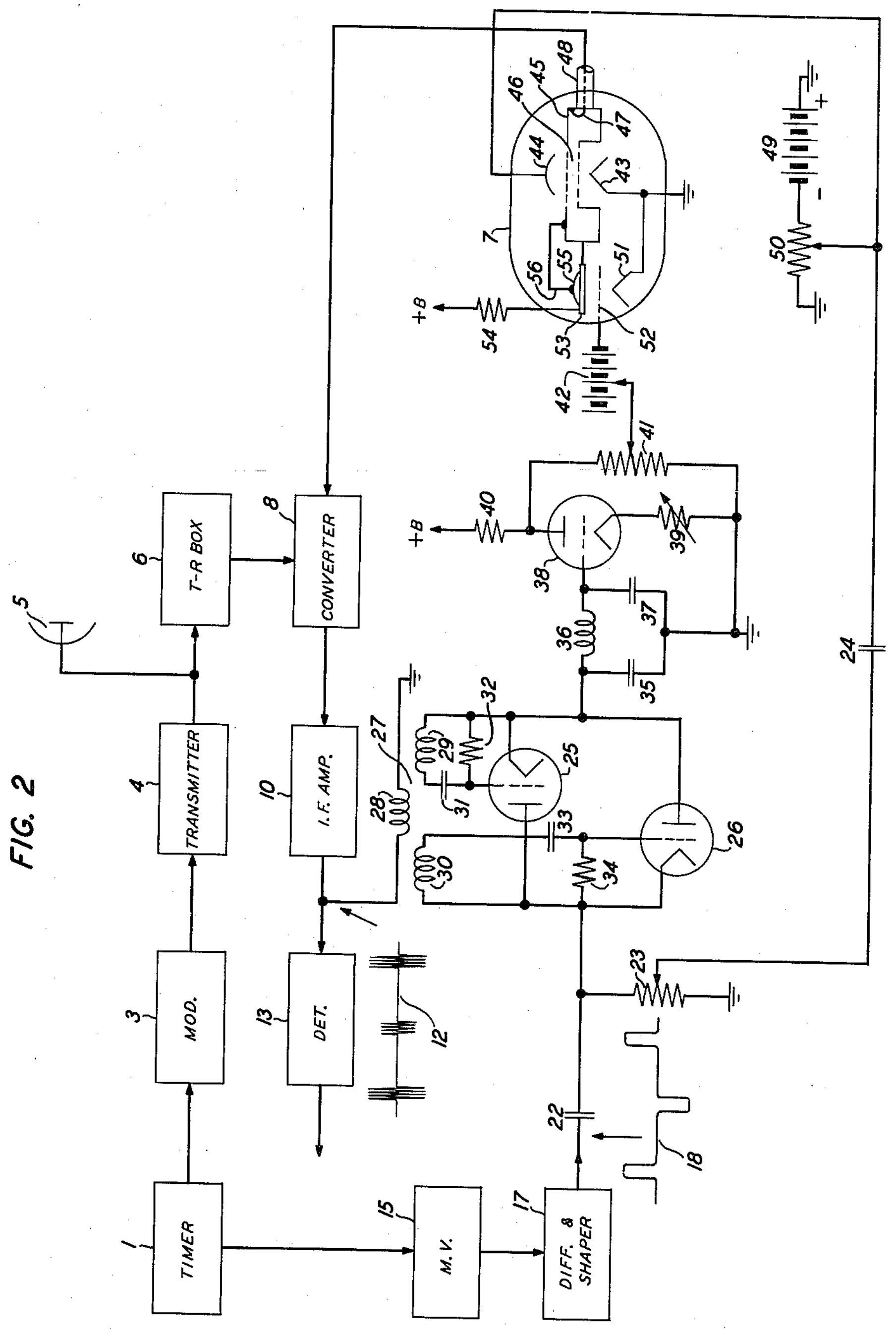

In connection with the following detailed description of the invention, reference is made to the accompanying drawings, of which:

Fig. 1 is a block diagram of a pulsed transmitter-receiver system including the invention; and Fig. 2 shows in more detail one embodiment of the invention.

Referring to Fig. 1, there is shown in block form a pulsed transmitter-receiver system representative of a common type of radar which includes the following elements: timer unit 1, modulator 3, transmitter 4, antenna 5, T–R box 6, converter 8, beating oscillator 7, intermediate frequency amplifier 10, and detector 13. Components which ordinarily follow the detector are omitted. Timer unit 1 generates a regularly recurring succession of negative voltage pulses, such as represented by wave form 2, which determine the pulse rate of excitation of the transmitter, and which also serve for synchronizing the operation of the entire system. Modulator 3 is triggered by the voltage pulses from the timer and generates the necessary high voltage pulses for exciting transmitter 4. The transmitter is usually a magnetron oscillator and each time it receives a high voltage pulse from the modulator it emits a pulse of high frequency waves, the pulse width generally being of the order of one microsecond or less. These waves are radiated in a focussed beam from antenna 5, and reflected waves from the object it is desired to locate are received by the same antenna. T–R box 6 is an electronic transmit-receive switch which is automatically closed by each transmitter pulse to protect the receiver system and which opens immediately thereafter and passes on the weak reflected pulse to the converter 8. In the converter the reflected waves are mixed with waves of a different frequency generated by the beating oscillator 7 to produce waves of a lower frequency, which are then amplified by intermediate frequency amplifier 10 and converted into video signals by detector 13. The video signals thus produced are amplified by a video amplifier not shown, and may be displayed on the screen of an oscilloscope.

In combination with the transmitter-receiver system just described, there is shown also in Fig. 1 a block schematic of the frequency control system, comprising multivibrator 15, differentiator and shaper circuits 17, gated rectifiers 19 and 20, and integrating and mixing circuits 21. Block 15 represents a known form of triggered alternating multivibrator which has two stable states of equilibrium, one tube conducting while the other is resting, and vice versa. Negative pulses from timer 1 are applied to the multivibrator and alternately change it from one state of equilibrium to the other. The output voltage from one section is a square wave such as represented by wave form 16, and the output from the other section is a similar wave (not shown) but differing 180 degrees in phase. This is a type of multivibrator frequently used in circuits for counting devices and a detailed description of its operation, in one of its various forms, will be found in an article entitled "A Four-Tube Counter Decade," by John T. Potter, published in Electronics for June 1944.

The output of one section of the multivibrator, as voltage wave 16, is applied to a differentiator and pulse shaper circuit represented by block 17 and thereby converted to a wave of alternate positive and negative pulses as represented by wave form 18. The circuit required for this operation is likewise conventional and needs no further discussion except to state that it is designed to give wave 18 a substantially rectangular form and a pulse width approximately equal to that of the transmitter.

A portion of the output of the differentiator and shaper unit 17 is applied to an electrode of the beating oscillator 7 with the result that the oscillator frequency is alternately increased and decreased for the duration of each pulse. In converter 8 the altered frequency waves are mixed with simultaneously occurring waves from the transmitter. Although the T–R box is designed to act as an open circuit between transmitter and converter for the duration of the transmitter pulse, nevertheless there is sufficient leakage through it for the desired purpose. The difference frequency output of the converter, which is represented by wave form 9, consists therefore of successive pulses having the same amplitude but differing in frequency. These are passed on to amplifier 10 for amplification.

The amplifier has a single-peak selectivity characteristic such as shown by curve 11. By virtue of this characteristic, therefore, the successive pulses at the output of the amplifier, as represented by wave 12, will differ in amplitude except when their mean frequency corresponds to the peak of the selectivity curve. Their difference is thus an indication of the deviation of the mean frequency and affords a means for deriving a control voltage for correcting the error. This result is accomplished by segregating the alternate pulses of wave 12 by applying them to the separate rectifiers 19 and 20, to which are applied also, as gating voltages, the synchronous pulses of wave 18. One of the rectifiers is connected so as to be conductive when it receives a positive pulse from the gate pulse source 17, and the other when it receives a negative pulse, and each conducts in proportion to the amplitude of the pulse it receives from amplifier 10. The outputs of the two rectifiers, consisting of trains of direct-current pulses, are passed to an integrating and mixing circuit 21 in which they are integrated and filtered and the resulting smoothed currents combined differentially. The result is a direct-current control voltage which is applied to an electrode of the beating oscillator and is of the proper polarity to restore its mean frequency to the correct value.

Since the frequency of the beating oscillator is shifted by pulses 18 only at the instants the high frequency pulses are transmitted, and since it returns to the value determined by the smoothed differential control voltage in the intervals between the transmitted pulses, the control does not interfere with the normal detection of the reflected pulses.

Fig. 2 shows in greater detail one form of the control circuits of the invention. Here, like characters represent the same elements as in Fig. 1. In this diagram the beating oscillator 7 is shown as a velocity modulated reflex oscillator, although other types may be suitable for use with the invention. It contains a main cathode 43, a repeller electrode 44, negatively polarized by source 49 at a potential determined by adjustment of potentiometer 50, an anode consisting of a metallic resonating cavity 45 including grids 46, and a probe 47 for taking out energy through the coaxial cable 48. The frequency of oscillation depends upon the voltage on the repeller electrode, and also upon the resonant frequency of the cavity, which in turn depends upon its dimensions and particularly upon the separation between grids 46, which governs the resonator capacitance. In the design illustrated an adjustment of the grid gap is provided by a separate triode included within the same envelope, represented by cathode 51, tuner grid 52 and anode 53, a biasing battery 42 being connected in the grid-cathode circuit. The anode, which may be an elongated channel piece, is attached mechanically and electrically to the resonant cavity 45, and is connected to the positive voltage supply through resistor 54. Cathodes 43 and 51 are grounded. Mounted on anode 53 is a flexible bow 55 which is rigidly coupled to the upper face of the cavity enclosure by a mechanical element 56. The upper face of the cavity enclosure 45 is made flexible so that it may follow the movement of the strut 56. A variation of the voltage applied to grid 52 causes a change in the space current in the triode which alters the length of anode 53, by virture of its heating effect, causing the curve of the bow to fall as the space current increases, and vice versa. This brings about corresponding changes in the separation of grids 46 and hence in the oscillator frequency. For details of the structure of a thermally tuned oscillator of this type, reference may be made to an article by J. R. Pierce and W. G. Shepherd entitled "Reflex oscillators," published in the Bell System Technical Journal, July 1947, and particularly to Figs. 75 to 78 therein.

The output of the differentiator and pulse shaper circuit 17, represented by wave form 18, is connected through coupling condenser 22 across potentiometer 23, and by means of the potentiometer slider a portion of the output is applied through coupling condenser 24 to the repeller electrode 44 of the beating oscillator. These alternate positive and negative pulses raise and lower the oscillator frequency, and the output so modulated is delivered by line 48 to the converter 8. As described for Fig. 1, the result at the output of the intermediate frequency amplifier 10 is a wave form such as 12, the successive pulse amplitudes being unequal unless the mean frequency is at the peak of the input selectivity characteristic.

Vacuum tubes 25 and 26 are gated rectifiers which perform the function of blocks 19 and 20 in Fig. 1. The plate of tube 25 and the cathode of tube 26 are connected to receive the output of the differentiator and shaper unit as developed across resistor 23. The cathode of tube 25 and the plate of tube 26 are connected to one side of condenser 35, the other side of which is connected to ground. Thus tube 25 will conduct and charge condenser 35 when it receives a positive pulse at its plate, while tube 26 will conduct when it receives a negative pulse at its cathode and will tend to charge the condenser to the opposite polarity.

Transformer 27 is connected to receive through its primary winding 28 a portion of the output of intermediate frequency amplifier 10, and to pass on the induced voltage in its two secondaries 29 and 30 to the grids of tubes 25 and 26, respectively. Condensers 31 and 33 are blocking condensers, and resistors 32 and 34 are corresponding grid leaks for the two tubes, so that after a few cycles rectification of the intermediate frequency waves causes the grids to become negatively biased in degrees proportional to the amplitudes of the impressed oscillations. The pulses of waves 12 and 18 are in synchronism with each other and the alternate synchronous pulses of wave 18 cause first one tube to conduct and then the other, the relative conductivities of the two tubes depending upon the relative amplitudes of the successive rectified pulses from transformer 27. In this process condenser 35 will tend to be charged first to one polarity and then to the opposite polarity, the net charge depending upon which tube has the greater conductivity. Thus it will be seen that the alternate pulses of wave 12 are separated, the direct-current voltages which they produce being integrated and differentially combined by means of condenser 35. To aid in smoothing out pulse ripples in the voltage on this condenser it is advantageous to add choke coil 36 and condenser 37 as shown. This coil and the two condensers therefore perform the function of the integrator and mixer unit 21 shown in Fig. 1. The resistance of resistor 23 should be made high enough to prevent any substantial leakage of the charge on condenser 35 through one or other of the rectifier tubes in the intervals between the synchronizing pulses.

The differential voltage developed across condenser 37 is applied to the grid of amplifier tube 38, which is negatively biased by variable cathode resistor 39 and which has its plate connected to the positive voltage supply through load resistor 40. A suitable fraction of the output voltage, obtained from high resistance potentiometer 41 connected between the plate and ground, is applied in series with a portion of the voltage of battery 42 to the tuner grid 52 of the control triode in the oscillator.

The operation of the frequency control circuit just described may be summarized as follows: Alternate positive and negative voltage pulses, generated by multivibrator 15 and shaped by the circuits of block 17, and in synchronism with the outgoing pulses of transmitter 4, are applied to the repeller electrode 44 of beating oscillator 7 to alternately raise and lower its frequency for the duration of each transmitter pulse. These pulses of altered frequency are mixed in converter 8 with simultaneously occurring pulses from the transmitter. The resulting difference-frequency pulses are amplified by intermediate frequency amplifier 10, giving rise at the output to alternate pulses of unequal amplitude if the mean frequency of the oscillations of the converter output pulses does not coincide with the mid-frequency of the amplifier response characteristic; that is, if the difference between the beating oscillator frequency and the transmitter frequency is incorrect. Pulses of direct current proportional in magnitude to the respective amplitudes of the alternate pulses from amplifier 10, and flowing in opposite directions, are produced in rectifiers 25 and 26 by applying thereto the synchronous pulses from amplifier 10 and from block 17. These direct-current pulses are integrated, smoothed and differentially combined in the circuit consisting of condensers 35 and 37 and choke coil 36. The resultant voltage is amplified by tube 38 and applied as a control voltage to tuner grid 52 of the beating oscillator in a polarity to correct any deviation of its frequency.

The sense of the control may be seen from the following considerations: The well-known effect of varying the repeller voltage of a reflex oscillator is that as the voltage is made more negative the frequency increases, and vice versa. Hence in the system illustrated the beating oscillator frequency will be shifted downwards by the positive pulses of wave 18 and upwards by the negative pulses. If the mean frequency of the beating oscillator is too low, but higher than the transmitter frequency, then because of the selective characteristic of the intermediate frequency amplifier, the lower frequency pulses in the amplifier output, wave form 12, will be smaller in amplitude than the higher frequency pulses. Since under these conditions gated detector 25 selects the lower frequency pulses and detector 26 selects the higher frequency pulses, the result will be that the flow of plate current in the former is blocked to a lesser degree than in the latter by the negative rectified voltages appearing at their grids, and condenser 37 will therefore accumulate a positive charge. This will cause tuner grid 52 of the control triode to become more negative, reducing the anode current and, consequently, the anode temperature. The linear contraction of the anode increases the curvature of bow 55, causing strut 56 to rise and increase the separation of the beating oscillator grids, thereby increasing the mean oscillation frequency. A converse action take place when the mean frequency is too high.

A similar analysis will show that the control is also in the right direction when the mean frequency of the beating oscillator is lower than that of the transmitter.

In Fig. 2 a method has been shown for applying an automatic frequency control voltage to the tuner grid of a reflex oscillator when such a grid is provided. If the reflex oscillator is not designed for this thermo-mechanical method of frequency control, the automatic control voltage may be applied to the repeller electrode instead, being superimposed upon the normal direct-current voltage and the frequency modulating pulses applied to this electrode. The invention is applicable also to other types of oscillator that have a suitable frequency controlling electrode.

What is claimed is:

1. In a radio transmitter-receiver system comprising a pulsed high frequency transmitter, a beating oscillator, a converter, and an intermediate frequency amplifier, the method of automatically controlling the frequency of the said beating oscillator which comprises pulsing it to frequencies above and below its mean frequency in synchronism with the outgoing transmitter pulses, demodulating the pulsed beating oscillator waves with portions of the outgoing transmitter pulses to produce pulses of intermediate frequencies, separately selecting the alternate pulses of the amplified intermediate frequency waves, rectifying and integrating the rectified alternate pulses, differentially combining the resulting steady currents to produce a control voltage, and applying the control voltage to vary the frequency of the beating oscillator.

2. In combination, a transmitter of pulses of high frequency waves, a receiver for receiving said pulses as reflected by distant objects comprising a beating oscillator, a converter for combining waves directly from said transmitter as well as said reflected waves with the output of said beating oscillator to produce waves of an intermediate frequency, an intermediate frequency amplifier for selectively amplifying the output of said converter, means for alternately increasing and decreasing by approximately equal amounts the frequency of said oscillator for the duration only of the respective pulses emitted by said transmitter, a gating circuit for separately selecting the output of said intermediate frequency amplifier during the respective periods in which the oscillator is operating above and below its mean frequency, and means responsive to the difference between the respective selected outputs of said intermediate frequency amplifier for automatically regulating the mean frequency of said oscillator.

3. In combination, a transmitter of pulses of high frequency waves, a receiver for receiving said pulses as reflected by distant objects comprising a beating oscillator for producing waves for combining with the received waves, said oscillator being provided with one or more frequency regulating electrodes, a converter for combining waves directly from said transmitter as well as said reflected waves with the output of said oscillator to produce waves of an intermediate frequency, an intermediate frequency amplifier for selectively amplifying the output of said converter, a circuit for producing alternate positive and negative pulses in synchronism with and of approximately the same pulse width as the transmitter pulses, means for applying said positive and negative pulses to one of said frequency regulating electrodes of the beating oscillator to alternately increase and decrease its frequency by approximately equal amounts for the duration only of the respective pulses emitted by said transmitter, a first and second gated rectifier for separately selecting the output of said intermediate frequency amplifier during the respective periods in which the oscillator is operating above and below its mean frequency, means for integrating the outputs of said rectifiers, means for differentially combining the said integrated outputs to obtain a control potential, and means for applying the said control potential to one of the said frequency regulating electrodes in a sense to maintain the mean frequency of the beating oscillator at such a value that the mean frequency of the output of said converter will be held at or near the mid-band frequency of said intermediate frequency amplifier.

4. In a radio transmitter-receiver system including a pulsed high frequency transmitter, a beating oscillator having a tunable cavity resonator, a repeller electrode and thermo-mechanical tuning means for said resonator embodying electrical heater means and a heat controlling electrode responsive to a control potential, a converter for combining waves from said transmitter with the output of said beating oscillator to produce waves of an intermediate frequency, and an intermediate frequency amplifier for selectively amplifying the output of said converter, means for automatically controlling the frequency of the said beating oscillator comprising a circuit for producing alternate positive and negative pulses in synchronism with and of approximately the same pulse width as the transmitter pulses, means for applying said positive and negative pulses to said repeller electrode to alternately increase and decrease the beating oscillator frequency by approximately equal amounts for the duration only of the respective pulses emitted by said transmitter, a first and second gated rectifier for separately selecting the output of said intermediate frequency amplifier during the respective periods in which the beating oscillator is operating above and below its mean frequency, means for integrating the outputs of said rectifiers, means for differentially combining the said integrated outputs to produce a control potential, and means for applying the said control potential to the said heat controlling electrode in a sense to maintain the mean frequency of the beating oscillator at such a value that the mean frequency of the output of said converter will be held at or near the mid-band frequency of said intermediate frequency amplifier.

5. In a radio transmitting and receiving system comprising a transmitter of recurrent uniform pulses of high frequency waves and a receiver of said pulses as reflected from distant objects or received directly from said transmitter, including a receiving converter, a heating oscillator, and a frequency selective intermediate frequency amplifier for difference frequency waves produced by the combination of the received pulses and the beating oscillations in said converter, the method of automatic frequency control which comprises shifting the frequency of the intermediate frequency waves alternately upwards and downwards by equal amounts in synchronism with and for the duration only of the transmitter pulses, selecting and rectifying the amplified intermediate frequency waves of higher frequency, separately selecting and rectifying the amplified intermediate frequency waves of lower frequency to produce a control voltage, and applying the control voltage to vary the frequency of the beating oscillator.

6. In a radio transmitting and receiving system comprising a transmitter of recurrent uniform pulses of high frequency waves and a receiver of said pulses as reflected from distant objects or received directly from said transmitter, including a receiving converter, a beating oscillator, and a frequency selective intermediate frequency amplifier for difference frequency waves produced by the combination of the received pulses and the beating oscillations in said converter, the method of automatic frequency control which comprises shifting the frequency of the intermediate frequency waves alternately upwards and downwards by equal amounts in synchronism with and for the duration only of the transmitter pulses, selecting and rectifying the amplified intermediate frequency waves of higher frequency, separately selecting and rectifying the amplified intermediate frequency waves of lower frequency, and controlling the frequency of the beating oscillator in accordance with the difference between the magnitudes of the two rectified waves.

7. In a radio transmitting and receiving system comprising a transmitter of recurrent uniform pulses of high frequency waves, and a receiver of said pulses as reflected from distant objects or received directly from said transmitter, including a receiving converter, a beating oscillator, and a frequency selective intermediate frequency amplifier for difference frequency waves produced by the combination of the received pulses and the beating oscillations in said converter, the method of automatic frequency control which comprises shifting the frequency of the intermediate frequency waves alternately upwards and downwards by equal amounts in synchronism with and for the duration only of the transmitter pulses, selecting and rectifying the amplified intermediate frequency waves of higher frequency, separately selecting and rectifying the amplified intermediate frequency waves of lower frequency, combining the two sets of rectified waves to produce a control voltage of sign and magnitude representative of the difference between the amplitudes of the higher and the lower frequency intermediate frequency waves, and applying the control voltage to vary the frequency of the beating oscillator in such sense as to make the amplitudes of the higher and the lower frequency intermediate frequency waves equal.

8. In a receiver for high frequency waves comprising a receiving converter, a beating oscillator, and a frequency selective intermediate frequency amplifier for difference frequency waves produced by the combination of received waves and beating oscillations in said converter, the method of automatic frequency control which comprises shifting the frequency of the intermediate frequency waves alternately upwards and downwards by equal amounts at recurrent intervals for short periods relative to the period of recurrence, selecting and rectifying the amplified intermediate frequency waves of higher frequency, separately selecting and rectifying the amplified intermediate frequency waves of lower frequency, and controlling the frequency of the beating oscillator in accordance with the difference between the magnitudes of the two rectified waves.

9. In a receiver for high frequency waves comprising a receiving converter, a beating oscillator, and a frequency selective intermediate frequency amplifier for difference frequency waves produced by the combination of received waves and beating oscillations in said converter, the method of automatic frequency control which comprises shifting the frequency of the intermediate frequency waves alternately upwards and downwards by equal amounts at recurrent intervals for short periods relative to the period of recurrence, selecting and rectifying the amplified intermediate frequency waves of higher frequency, separately selecting and rectifying the amplified intermediate frequency waves of lower frequency, combining the two sets of rectified waves to produce a control voltage of sign and magnitude representative of the difference between the amplitudes of the higher and the lower frequency intermediate frequency waves, and applying the control voltage to vary the frequency of the beating oscillator.

10. In a receiver for high frequency waves comprising a receiving converter, a beating oscillator, and a frequency selective intermediate frequency amplifier for difference frequency waves produced by the combination of received waves and beating oscillations in said converter, the method of automatic frequency control which comprises shifting the frequency of the intermediate frequency waves alternately upwards and downwards by equal amounts at recurrent intervals for short periods relative to the period of recurrence, selecting and rectifying the amplified intermediate frequency waves of higher frequency, separately selecting and rectifying the amplified intermediate frequency waves of lower frequency, combining the two sets of rectified waves to produce a control voltage of sign and magnitude representative of the difference between the amplitudes of the higher and the lower frequency intermediate frequency waves, and applying the control voltage to vary the frequency of the beating oscillator in such sense as to make the amplitudes of the higher and the lower frequency intermediate frequency waves equal.

11. Automatic frequency control apparatus for maintaining a fixed frequency difference between two high frequency sources comprising a converter for mixing oscillations from said sources to produce oscillations of an intermediate frequency, a frequency selective amplifier for amplifying said intermediate frequency oscillations, means for shifting the frequency of one of said sources alternately upwards and downwards by substantially equal amounts at recurrent intervals for short periods relative to the period of recurrence, means of producing a control voltage representative of the difference in amplitudes of the amplified intermediate frequency oscillations of higher frequency and those of lower frequency, and means responsive to said control voltage for varying the frequency of one of said sources to maintain the said fixed frequency difference.

12. Automatic frequency control apparatus for maintaining a fixed frequency difference between two high frequency sources comprising a converter for mixing oscillations from said sources to produce oscillations of an intermediate frequency, a frequency selective amplifier for amplifying said intermediate frequency oscillations, means for shifting the frequency of one of said sources alternately upwards and downwards by substantially equal amounts at recurrent intervals for short periods relative to the period of recurrence, selecting and rectifying the amplified intermediate frequency waves of higher frequency, separately selecting and rectifying the amplified intermediate frequency waves of lower frequency, combining the two sets of rectified waves to produce a control voltage of size and magnitude representative of the difference between the amplitudes of the higher and the lower frequency intermediate frequency waves, and applying the control voltage to vary the frequency of one of said sources in such sense as to make the amplitudes of the higher and the lower frequency intermediate frequency waves equal.

13. In a radio transmitter-receiver system comprising a pulsed high frequency transmitter, a beating oscillator, a converter, and an intermediate frequency amplifier, a combination of rapid acting and slow acting means for automatically controlling the frequency of the said beating oscillator, said rapid acting means comprising means for alternately increasing and decreasing by equal amounts the frequency of said oscillator for the duration only of the respective pulses emitted by said transmitter, and said slow acting means comprising a gating circuit for separately selecting the output of said intermediate frequency amplifier during the respective periods in which the oscillator is operating above and below its mean frequency, and means responsive to the difference in amplitude between the respective selected outputs of said intermediate frequency amplifier for automatically regulating the mean frequency of said oscillator.

14. In a radio transmitter-receiver system including a pulsed high frequency transmitter, a beating oscillator having a tunable cavity resonator, a repeller electrode and thermo-mechanical tuning means for said resonator embodying electrical heater means and a heat controlling electrode responsive to a control potential, a converter for combining waves from said transmitter with the output of said beating oscillator to produce waves of an intermediate frequency, and an intermediate frequency amplifier for selectively amplifying the output of said converter, a combination of rapid acting and slow acting means for automatically controlling the frequency of the said beating oscillator, said rapid acting means comprising a circuit for producing alternate positive and negative pulses in synchronism with and of approximately the same pulse width as the transmitter pulses and means for applying said positive and negative pulses to said repeller electrode to alternately increase and decrease the beating oscillator frequency by approximately equal amounts for the duration only of said pulses, and said slow acting means comprising a first and second gated rectifier for separately selecting the output of said intermediate frequency amplifier during the respective periods in which the beating oscillator is operating above and below its mean frequency, means for integrating the outputs of said rectifiers, means for differentially combining the said integrated outputs to produce a control potential, and means for applying the said control potential to the said heat controlling electrode in a sense to maintain the frequency of the beating oscillator at such a value that the mean frequency of said converter will be held at or near the mid-band frequency of said intermediate frequency amplifier.

15. In a rado transmitting and receiving system comprising a transmitter of recurrent uniform pulses of high frequency waves and a receiver of said pulses as reflected from distant objects including a receiving converter, a beating oscillator, and a frequency selective intermediate frequency amplifier for difference frequency waves produced by the combination of the received reflected pulses and a portion of the output of said oscillator, means for automatically controlling the said oscillator comprising a second converter for combining a portion of the output of said transmitter with a second portion of the output of said oscillator, a second intermediate frequency amplifier for selectively amplifying the output of said second converter, means for alternately increasing and decreasing by approximately equal amounts the frequency of said oscillator for the duration only of the respective pulses emitted by said transmitter, a gating circuit for separately selecting the output of said second intermediate frequency amplifier during the respective periods in which the oscillator is operating above and below its mean frequency, and means responsive to the difference in amplitude between the respective selected outputs of said second intermediate frequency amplifier for regulating the mean frequency of said oscillator.

References Cited in the file of this patent

UNITED STATES PATENTS

| | | |
|---|---|---|
| 2,211,750 | Humby | Aug. 20, 1940 |
| 2,425,013 | Stolz | Aug. 5, 1947 |
| 2,434,293 | Stearns | Jan. 13, 1948 |
| 2,434,294 | Ginzton | Jan. 13, 1948 |
| 2,437,268 | Miller | Mar. 9, 1948 |
| 2,445,409 | Shank | July 20, 1948 |
| 2,469,875 | Fyler | May 10, 1949 |
| 2,475,074 | Bradley | July 5, 1949 |